United States Patent [19]

Stöhr et al.

[11] Patent Number: 4,740,104
[45] Date of Patent: Apr. 26, 1988

[54] UNDERGROUND IRRIGATION OR WATERING OF SOIL

[75] Inventors: Helmut Stöhr, Wuppertal; Karl Ostertag, Erlenbach, both of Fed. Rep. of Germany

[73] Assignee: Akzo N V, Arnhem, Netherlands

[21] Appl. No.: 904,897

[22] Filed: Sep. 5, 1986

Related U.S. Application Data

[63] Continuation of Ser. No. 638,981, Aug. 8, 1984, abandoned, which is a continuation of Ser. No. 335,394, Dec. 29, 1981, abandoned.

[30] Foreign Application Priority Data

Dec. 31, 1980 [DE] Fed. Rep. of Germany ....... 3049558

[51] Int. Cl.⁴ .............................................. E02B 13/00
[52] U.S. Cl. ......................................... 405/43; 264/49; 405/36; 405/45; 521/64; 521/143
[58] Field of Search ......................... 405/36, 43, 45, 46, 405/47, 48; 264/209.1, 49; 521/143, 64

[56] References Cited

U.S. PATENT DOCUMENTS

| | | | |
|---|---|---|---|
| 2,807,505 | 9/1957 | Weitzel | 405/45 X |
| 3,003,643 | 10/1961 | Thomas | 405/45 X |
| 3,073,735 | 1/1963 | Till et al. | 405/45 X |
| 3,879,243 | 4/1975 | Medney | 156/173 X |
| 3,936,380 | 2/1976 | Boske | 405/45 X |
| 3,946,762 | 3/1976 | Green | 405/45 |
| 4,003,408 | 1/1977 | Turner | 405/43 X |
| 4,019,326 | 4/1977 | Herveleng et al. | 210/491 X |
| 4,076,656 | 2/1978 | White et al. | 521/64 |
| 4,162,863 | 7/1979 | Gaudard et al. | 405/45 |
| 4,182,581 | 1/1980 | Uehara et al. | 405/43 |
| 4,182,582 | 1/1980 | Youval et al. | 405/45 |
| 4,221,501 | 9/1980 | Saburi | 405/37 |
| 4,235,561 | 11/1980 | Peterson | 405/45 |
| 4,307,201 | 12/1981 | Won et al. | 521/64 |
| 4,434,250 | 2/1984 | Kessler | 264/209.1 X |

Primary Examiner—Dennis L. Taylor
Attorney, Agent, or Firm—Michael J. Striker

[57] ABSTRACT

System for the artificial underground irrigation or watering of soil, with flexible tubing of a porous material, characterized by tubes with a non-expanded porous inside structure. The tubes are obtained through extrusion of a homogeneous mixture of at least two components, one component a meltable polymer and the other component a liquid inert in relation to the polymer. Both components forming a binary system displaying in liquid aggregate state a range of complete miscibility and a range with a miscibility gap. Preferred parameters include an inside tubing wall surface with open pores and an outer wall surface, the degree of openings of which, calculated as fraction of open area, is reduced at least 20% in relation to the inside wall surface; open pores in the outer wall surface for the most part of a pore diameter of less than 4 μm; tubes with a pore cavity volume of from 50–90%; tubes made of polypropylene; tubes made of glass fiber-reinforced polypropylene; tubing wall thickness of about 0.5 to 2.5 mm and outer diameter of about 2.5 to 25 mm. The tubing may be disposed within tubular-shaped sheaths of a matted web, composed of a plurality of fibers melt-spun from synthetic polymer, crossing over in places and fused together at the places of crossing. The sheaths may have a longitudinal grooved contour, and the matted web may be composed of polycaprolactam fibers with a diameter of about 0.2 to 1.5 mm. Couplings composed of the same material as the sheaths may be disposed at intersections thereof. The system is useful for the irrigation of grass, for irrigation in several layers, for permanent irrigation in arid zones, for the distribution of fertilizer, herbicides and/or pest control agents.

14 Claims, 1 Drawing Sheet

U.S. Patent     Apr. 26, 1988     4,740,104
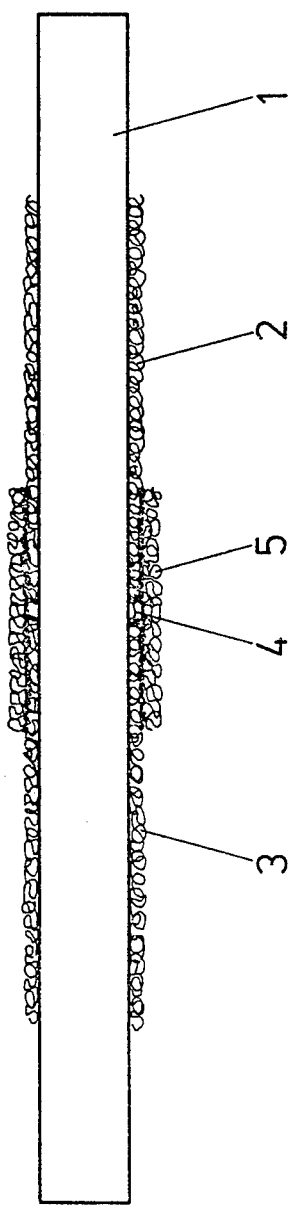

1

UNDERGROUND IRRIGATION OR WATERING OF SOIL

This is a continuation of application Ser. No. 638,981, filed Aug. 8, 1984, abandoned, which in turn is a continuation of Ser. No. 335,394, filed Dec. 29, 1981, abandoned.

BACKGROUND OF THE INVENTION

The invention concerns a system for the artificial underground irrigation or watering of soil, with flexible tubing of porous material.

It is known to irrigate or water soil with the said of pipes or tubes laid underground.

In German Auslegeschrift No. 1,759,909, tubes of plastic resin for the irrigation or watering of soil are described, which is composed of swellable plastic foam, and the outer surface of which is a substantially non-permeable membrane, in which at appropriate intervals from each other, openings are disposed. In order to obtain these openings, the membrane must be provided with cuts or punctures.

It is disadvantageous that it is extremely difficult to provide the cuts or punctures with an exactly accurate size and depth as desired. It thus becomes unavoidable, that from the openings which turn out too deep or too large, undesirably much water escapes from the irigation pipe, so that flooding can occur at such places in the ground, whereas other places are provided with too little water. In addition, such openings tend to become easily obstructed as a result of the infiltration of earth or plant roots.

Moreover foam materials, which are produced according to customary methods working with swelling agents, are less suitable for the provision of a controlled addition of water, since on the one hand the structure of the cavities is very irrigular, and, on the other hand, such structures react very strongly to pressure changes.

Also, as mentioned in U.S. Pat. No. 2,807,505, pipes having a foam structure possess the risk of collapse when they are not filled with water, so that one is forced either to keep the pipes permanently under pressure or to increase the wall thickness, which measures lead to difficulties of their own while providing the water. It is also a disadvantage of these pipes that they have a wrinkled surface.

A flexible continuous porous tube is described in German Offenlegungsschrift D.E.-O.S. No. 1,954,748, which is supposed to serve for the distribution on the suface. This pipe, which is produced from twists, mats, or webs of fibers, should display a porosity which is the least in the vacinity of water supply and is the greatest at the end of the tube. The production of such tubing is extremely complicated. Beyond that, with webs, twists or the like of fibers or filaments, a constant or a continuously decreasing porosity is obtained only with great difficulty; with the slightest defect in the web construction there arises larger openings, through which the water can penetrate unhindered into the ground, so that also with this type of tubing there are problems similar to those which have already been mentioned above.

German Offenlegungsschrift D.E.-O.S. No. 2,642,623 describes a tubing for the purpose of irrigation, in particular for droplet or below ground watering, the cross-section of which has an approximately spiral form. The ends of the spiral are connected by an elastic longitudinal cross-piece, which is closed during pressure-less state of the tubing, and proceeds approximately radially and with increasing interior pressure becomes bent in the direction of a peripheral position. At lengthwise intervals, there are disposed in the cross-piece from time to time outflow canals, through which with suitable pressure, the water should be admitted into the ground. Apart from the fact that such constructions are complicated, the matter of operation of such irrigation tubes is strongly endangered when the tubing becomes pinched, e.g. through stones or compressed masses of earth, to such an extent that with increasing interior pressure they cannot expand.

Such a system only a watering concentrated at points, and no uniform continuous irrigation at all places along the pipe; in other respect, there is also present here the risk of clogging.

Although already a great number of arrangements are known for the underground irrigation of soil, there persists yet a need for improved systems for the underground irrigation and watering of soil, which do not display the above-mentioned disadvantages.

SUMMARY OF THE INVENTION

It is therefore an object of the present invention to make available a system for the artificial underground irrigation or watering of soil, with flexible tubing, which allows a uniform, constant and economical irrigation or watering of soil, which is insensitive in the face of pressure changes in the ground, which does not tend to clog, and which works in a simple manner.

This object is attained through a system for the artificial underground irrigation or watering of soil, with flexible tubing of porous material, characterized by tubing with a non-expanded porous inside structure.

The hose has inside, a large continuous hollow sace through which a liquid may be fed, for example, water. By definition, the hose comprises a flexible material, preferably rubber, and has an inner wall and an outer wall. As used in the present application, "inside structure" or "internal structure" are used to denote the internal structure of the material which is encompassed by the outer wall and the inner wall of the hose. As used in the present application, outside structure refers to the outer wall of the hose. The outside structure must, therefore, necessarily surrounded the inside, or internal, structure of the hose.

Suitable tubing with such an interior structure may be obtained through extrusion of a homogeneous mixture of at least two components, one component a meltable polymer and the other component a liquid inert in relation to the polymer, both components forming a binary system displaying in the liquid aggregate state a range of complete miscibility and a range with a miscibility gap.

In a particularly advantageous embodiment of the invention, the tubing with the non-expanded porous interior structure possesses an inner wall surface with open pores and an outer wall surface, the degree of openings of which, calculated as fraction of open area, is reduced at least 20% in relation to the inside wall surface.

It is favorable for the pores of the outer wall surface to display for the most part a pore diameter of less than 4 $\mu$m, preferably less than 3 $\mu$m.

The pore cavity volume of the tubing amounts to 50–90%, preferably 70–80%. A suitable synthetic polymer for the tubing is polypropylene. The polypropylene can also be reinforced with glass fibers.

Suitable wall thicknesses for the tubing fall within about 0.5 and 2.5 mm, preferably 1 to 1.5 mm; the outer diameter lies approximately between about 2.5 and 25 mm, preferably between about 7 and 12 mm. It can also, e.g. with very long tubing, have greater diameter and wall thickness.

In a particularly advantageous embodiment of the invention, the tubes are disposed in tubular-shaped sheaths, which have been produced from a matted web, which is composed of a plurality of fibers melt-spun from synthetic polymers, crossing over in places and fused together at the places of crossing. The sheaths can be produced from a matted web with longitudinal grooved contour. Preferably, the matted web is composed of polycarprolactam fibers with a diameter of about 0.2 to 1.5 mm. It is favorable when the sheathing is provided at the intersections with couplings, which expediently are composed of the same material as the sheathing.

The system is particularly suitable for the irrigation of grass, irrigation in several layers, and permanent irrigation in arid zones.

The system according to the present invention can also be used for distribution of fertilizers, herbicides and pest control agents, among others.

Non-expanding means, within the scope of the invention, that the pores or cavities in the porous material have not been obtained through the use of customary blowing agents or gases, such as is the case with the foamed materials.

By pores are to be understood cavities in the material, of whatever geometry, and includes spherical, cellular, oblong, regularly or irregularly formed cavities, which more or less are situated in connection with each other. By diameter of a pore should be understood the diameter of a sphere of the same volume. Porous structures, as are present in the interior of the tubing according to the present invention, are also found in the polymer structures described in German Offenlegungsschrift D.E.-O.S. No. 2,737,745.

The production of tubing, such as is provided for use according to the present invention, can ensue in the following manner:

One prepares initially a single-phase liquid mixture from a polymer and a solvent which is a liquid inert in relation to the polymer, and whereby both components, i.e. the liquid and the polymer, form a binary system which in fluid aggregate state displays a range of complete miscibility and a range with a miscibility gap.

Suitable combination of such polymer and inert liquid can be gathered from German Offenlegungsschrift D.E.-O.S. No. 2,737,745. A particularly favorable mixture is composed of polypropylene and N,N-bis (2-hydroxyethyl) hexadecylamine.

Such a liquid, single-phase mixture can then be produced into pipes or tubing by extruding through a suitable nozzle, into a bath, in which the polymer hardens. As bath fluid, e.g. water or alcohol can serve.

It is expedient when the extrusion mass is led from below to above through the spin bath, that is the nozzle is located inside the coagulating bath, e.g. at the bottom of a suitable apparatus, and the emerging tube is removed from below to above through the bath, and leaving the bath it is appropriately transported forward.

The nozzle, upon which the coaguation liquid is situated, is in suitable manner thermally isolated from the spinning bath, so that within the nozzle no solidification of the polymer can occur.

A suitable method for the production of tubing, such as is provided for use within the scope of the invention, is more closely described in the German Patent Application No. 3,049,579 filed contemporaneously herewith, Method for the production of Porous Tubing.

The sheath provided within the scope of a particularly advantageous embodiment of the invention, can be produced in simple manner from a matted web. One produces initially an appropriate matted web, for which can serve the method more closely described in German Offenlegungsschrift D.E.-O.S. No. 2,530,499. The mat, which either has been producewd with appropriate width or is worked up to appropriate width through cutting of larger matted webs, is then for example formed through drawing through a tube-shaped nozzle into a tube-like shape, which is then fused at the place where both sides of the mat adjoin one another.

It is possible to then introduce the tubing into the tube-shaped envelope or sheathing and to locate the tube-shaped sheathing in the ground together with the tubing. One can, however, also initially locate the tube-like protective sheath in the ground and introduce the tubing at a later point in time into the sheath.

In practical manner the sheathing at its intersections is provided with couplings, which hold the sheathing together.

The novel features which are considered as characteristic for the invention are set forth in particular in the appended claims. The invention itself, however both as to its construction and its method of operation, together with additional objects and advantages thereof, will be best understood from the following description of specific embodiments when read in connection with the accompanying drawing.

BRIEF DESCRIPTION OF THE DRAWING

The drawing shows a schematic, longitudinal cross-section through a porous tubing according to the present invention, provided with sheathing and coupling.

DESCRIPTION OF THE PREFERRED EMBODIMENTS

In the FIGURE, reference number 1 indicates the porous tubing serving for irrigation according to the present invention. Reference numbers 2 and 3 are two sheathings, which intersect together at intersection place 4, where coupling 5 connects both sheathings with each other.

For underground irrigation, the tubing can be located in the ground alone or provided with an appropriate sheathing. The filling with water can occur in simple manner. It is thus sufficient in many cases for one to join to the tubing, or across an appropriate tubing connection, a vessel filled with water. The hydrostatic pressure, which then adjusts in the tubing, is sufficient enough to provide for a uniform, continuous distribution of water in the earth.

Often, it is even sufficient when one, corresponding to the amount of water which one whishes to distribute, allows the water to enter the tubing system dropwise with the aid of a simple drop arrangement. Therewith, the inlet of the tubing can be provided with an appropriate funnel. One can also introduce a capillary pipe or a glass tube for the water, to take care of the feeding-in of a determined number of drops per unit time.

The tubing can, indeed according to the purpose of use, be located more or less deely within the earth. It is thus sufficient for the irrigation of grass, when the tubing is located at a depth from about 5 to 10 cm.

When it is desired to irrigate soil from which plants are supposed to be pulled, the roots of which reach substantially deeper, it is obviously possible to locate the tubing also substantially deeper in the groud. It goes without saying that the tubing can be located in side-by-side intervals. Therewith, the spacing of the individual tubes depends upon the individual irrigation problem, according to how much water is necessary and how intensively the irrigation should proceed. Thus, e.g. with irrigation of grasses, the distance between the individual tubes can amount, for example, to about 20 to b 30 cm. In connection therewith, indeed according to local conditions and the nature of the soil, also greater or smaller intervals are suitable. The parallel-disposed tubing can be supplied from a water well or water supply tank.

Depending upon the particular irrigation problem involved, one can also place the tubes superimposed, and distribute them in several layers in the ground, so that, for example, three or four layers are provided with water, which are situated, e.g. at 10, 20, 30, and 40 cm intervals removed from the surface of the ground. Such arrangements are very suitable for mixed cultures of plants.

With the irrigation of plants, e.g. trees, which develope in the earth a tapering or conical root production, one can so fashion the irrigation through appropriate tapering distribution of the tubes in the ground, that in this manner an optimal supply of moisture occurs at these roots.

The tubings according to the present invention are not suitable only for the irrigation of small sodded surfaces, as are typical near homes, but can also provide larger grassy areas, e.g. golf courses, athletic fields such as football stadiums, and the like, with water. Moreover, pastures and meadows can be appropriately irrigated.

According to the invention, also arable soil, plantations with several year old stock, soil in hot houses, large garden areas for flowers and vegetables, vineyards and the like may be irrigated. In many cases, the tubing can be layed simultaneously during plowing.

With the insertion of determined polymers, which are very strongly hydrophobic, e.g. polypropylene, it can be necessary, in order to commence irrigation, to pretreat the interior of the tubing in order to make it hydrophilic, with a suitable liquid, such as e.g. ethyl alcohol, or a solution of a wetting agent, whereby a better wetting of the inside of the tubing with water occurs. Often, it is sufficient to drive the system with a high pressure, e.g. 1.5 bar. For that purpose, the customary water conduit pressure of about 6 bar is completely sufficient.

It was particularly surprising that with the aid of the system according to the present invention, an underground artificial irrigation may be performed in excellent manner. One can in this fashion guarantee a uniform addition of water to a larger surface, since on the basis of the particular distribution mechanism, no pressure drop worth mentioning occurs in the tubing. The interior of the tubing is more or less constantly filled with water, and delivers the water into the earth slowly and uniformly on account of the fine, capillary-like pore system. The occurrence, for example at the beginning of the tubing, of substantially more water flowing out than at the end of the tubing, cannot take place. Uncontrolled withdrawal of water at determined places, which leads to washing away of earth or even to flooding at such places, likewise does not occur.

Based upon the special surface structure of the tubing, a clogging thereof, through the setting in of earth, silt, bacteria or fine roots, does not take place, so that the tubing can be used for irrigation over a very long period of time.

The system according to the present invention can be used not only with single-year cultures but also with multple-year cultures. It is particularly advantageous that one can remove the tubing when sheaths are used, after a determined period of time, and, if necessary, it can be replaced by other tubing.

Based upon the fine pores in the surface of the tubing, the water is passed on in particularly fine, active form, into the ground. This cause on the one hand, the delivery of water directly to the roots in a very effective form, and, on the other hand, an extremely sparing and effective irrigation, which not only leads to great savings of water, but beyond that yields great savings in energy. It is not necessary for the water to be injected through pumps at high pressure into the tubing. It suffices completely when the water stays in the tubing at a fixed hydrostatic pressure. This means, that one fills the water, which should be distributed in the ground, indeed according to requirement, into supply tanks distributed in the grass or soil, which are then after more or less great intervals, re-filled according to need. It has been shown, that, for example for the irrigation of grasses, it can be sufficient when one, e.g. at the end of three days, re-fills the supply tank with water. For that reason, the underground irrigation according to the present invention is associated with very low operational expenditures.

Compared to an above-ground irrigation, and known underground irrigation systems, the system according to the present invention works with considerably reduced amounts of liquid. In general, the water consumption is so little compared to above-ground irrigation systems, that one provides at most 1/7 or less of the otherwise required amount of water, in order to obtain at least the same result. Losses through evaporation do not occur; in addition, the amount of water can be so regulated that a percolation or seepage of the valuable liquid is avoided. The risk of a salting can be opposed using the system according to the present invention. Also, a flooding at determined places, e.g. on account of large openings, does not occur.

The irrigation system according to the present invention is however particularly suitable for arid regions, in which one must be very economical with the water, for example in desert areas, in which practically no or only very little precipitation falls.

The systems according to the present invention is not only suitable for irrigation, but also for soaking the earth, e.g. with dissolved fertilizer. Since an extremely fine distribution occurs, and the manure can be brought directly to the roots of the plants, it is possible to work with a considerably reduced portion of fertilizer. One obtains thereby the same result or still better results, than when one introduces a multiple amount of fertilizer directly to the earth, from above the ground.

In addition, plant protection agents or pest control agents can be distributed in the ground through the system according to the present invention. It is also possible to work with extremely small concentrations, so that one can combine this procedure together with the irrigation. On account of the favorable effective distribution, one can distribute the additives as it were in homeophatic doses into the soil.

It was moreover, particularly surprising, that according to the present invention also glass fiber-reinforced tubing can be employed. Therewith, customary glass fiber-reinforced types of extrusion materials, e.g. glass fiber-reinforced polypropylene, are worked up with a correspondingly appropriate inert liquid, whereby it goes without saying that only the liquid and the polypropylene form a homogeneous system with each other, and the therein dispersed glass fibers are not taken into consideration as a phase. In this manner it is possible to operate at still more favorable optimum pressures.

Since the tubing displays not only in the radial direction, but also in the longitudinal direction a very favorable distribution of many pores lying in succession or contiguously, many of which possess diameters on the order and magnitude of 1 μm, a discharge velocity of the water is very constant and uniform over the entire length of the tubing. In addition, brief pressure fluctuations are absorbed by the system.

The tubing may be connected into conduits, whereby the possibility of too high a pressure can be decreased with the aid of a reducing valve. The flow rates allow for control through the choice of pressure; one can however also influence the flow rate through the adjustment of the portion of pore cavity volume during production of the tubing. The pore cavity volumes increase when, in the homogeneous extrusion mixture, the portion of inert liquid is increased.

The invention is more closely illustrated through the following example:

Two adjacent grassy surfaces measuring 1 m by 5 m are compared over a test period of one month, whereby one surface is watered conventionally, i.e. with a watering can, whereas the other is irrigated through an underground system according to the present invention.

A porous polypropylene tubing of non-expanded material with a pore cavity volume of 75% is produced by extrusion of a homogeneous mixture of 75% by weight N,N-2-hydroxyethyl-hexadecylamine and 25% by weight polypropylene, melt index 1.5 at a temperature of about 200° C., through a tube nozzle into a water bath at room temperature, whereby nitrogen is lead through the inner part of the nozzle and subsequently eliminated with ethanol, the tubing having an inner diameter of 6.5 mm and an outer diameter of 8.0 mm. The tubing is located as a cord with sections and intervals of 25 cm in a polyamide mat having dimensions of 1 m×5 m. The polyamide mat is obtainable according to a method described in German Offenlegungsschrift D.E.-O.S. No. 2,530,499. It is then covered with about 5 cm of soil. The end of the tubing is closed. The laying of the tubing follows in such manner that three tube sections lay parallel in longitudinal direction, with the outer two each at a distance of 25 cm from each 5 m border of the section of grass.

The water supply follows from a supply tank located about 1 m high. Through suitable openings of a value, the tubing is provided with 1 to 2l per day.

Both areas are treated simultaneously. For an approximately equal growth of grass, the surface which is treated with the water can must receive 10 times the amount of water applied to the section treated according to the present invention.

According to the invention, numerous polymers may be used for the tubing. Particularly suitable are polymers with hydrophilic character, e.g. polyamide, in particular Polyamide 6.

It will be understood that each of the elements described above, or two or more together, may also find a useful application in other types of tube systems differing from the types described above.

While the invention has been illustrated and described as embodied in an underground irrigation or watering of soil, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Apparatus for the underground irrigation or watering of soil, comprising:
a flexible tubing made of a synthetic polymer, having an outside wall surrounding an internal structure, said internal structure being made of a non-expanded porous materials, said flexible tubing being obtained through extrusion of a homogeneous mixture of at least two components, one component being a meltable polymer and the other component being a liquid inert in relation to the polymer, both components forming a binary system displaying in liquid aggregate state a range of complete miscibility and a range with a miscibility gap depending upon varying parameters of temperature and concentration.

2. The apparatus according to claim 1 wherein said flexible tubing of synthetic polymer with a non-expanded porous inside structure has an inside wall surface with open pores and an outer wall surface with openings, the degree of openings of which, calculated as a fraction of open area, at least 20% in relation to the open pores of the inside wall surface.

3. The apparatus according to claim 1 wherein said tubes which display open pores in the outer wall surface for the most part of a pore diameter of less than about 4 μm.

4. The apparatus according to claim 3 wherein said pore diameter is less than about 3 μm.

5. The apparatus according to claim 1, wherein said tubes have a pore cavity volume of from about 50-90%.

6. The apparatus according to claim 5 wherein said pore cavity volume is from about 70-80%.

7. The apparatus according to claim 1, wherein said tubes are made of polypropylene.

8. The apparatus according to claim 7 wherein said tubes are of glass fiber-reinforced polypropylene.

9. The apparatus according to claim 1 wherein said tubes have a wall thickness of about 0.5 to 2.5 mm and an outer diameter of about 2.5 to 25 mm.

10. The apparatus according to claim 9, wherein said wall thickness is from about 1 to 1.5 mm and said outer diameter is from about 7 to 12 mm.

11. The apparatus according to claim 1, wherein said tubes are disposed in tubular-shaped sheaths of matted web, which are composed of a plurality of fibers melt-upon from synthetic polymers, crossing over in places and fused together at the places of crossing.

12. The apparatus according to claim 11, wherein said sheaths of a matted web have a longitudinal grooved contour.

13. The apparatus according to claim 11 wherein said matted web is of polycaprolactam fibers with a diameter of about 0.2 to 1.5 mm.

14. The apparatus according to claim 11, further comprising couplings, composed of the same material as the sheaths and which are disposed at intersection of the sheath.

* * * * *